(12) United States Patent
Xu et al.

(10) Patent No.: US 9,404,218 B2
(45) Date of Patent: Aug. 2, 2016

(54) PRESS FELT BASE FABRIC EXHIBITING REDUCED INTERFERENCE

(71) Applicant: AstenJohnson, Inc., Charleston, SC (US)

(72) Inventors: Hanjiang Xu, Kanata (CA); Robert W. Huck, Fountain Inn, SC (US); Daniel N. Hedou, Clinton, SC (US)

(73) Assignee: AstenJohnson, Inc., Charleston, SC (US)

( * ) Notice: Subject to any disclaimer, the term of this patent is extended or adjusted under 35 U.S.C. 154(b) by 0 days.

(21) Appl. No.: 14/766,234

(22) PCT Filed: Feb. 6, 2014

(86) PCT No.: PCT/US2014/015054
§ 371 (c)(1),
(2) Date: Aug. 6, 2015

(87) PCT Pub. No.: WO2014/124111
PCT Pub. Date: Aug. 14, 2014

(65) Prior Publication Data
US 2015/0368863 A1 Dec. 24, 2015

Related U.S. Application Data

(60) Provisional application No. 61/761,280, filed on Feb. 6, 2013.

(51) Int. Cl.
*D21F 7/08* (2006.01)
*D03D 13/00* (2006.01)
(Continued)

(52) U.S. Cl.
CPC . *D21F 7/083* (2013.01); *B32B 5/06* (2013.01); *B32B 5/26* (2013.01); *D03D 13/004* (2013.01);
(Continued)

(58) Field of Classification Search
CPC ............... D21F 7/08; D21F 7/10; D21F 7/12; D21F 7/083; D21F 1/0027; D21F 1/10; D21F 1/0036; D21F 1/0045; D21F 1/0054; B32B 5/024; B32B 5/08; B32B 5/12; B32B 5/22; B32B 5/24; B32B 5/26; B32B 7/005; B32B 2250/20; D03D 15/0027; D03D 15/0083; D03D 15/0094; D03D 25/00; D03D 11/00; D03D 3/02; D03D 3/04; D03D 13/004; D03D 13/008
USPC ................... 162/348, 358.1, 358.2, 900–904; 139/383 A, 425 A, 383 AA; 428/193, 58, 428/397; 442/270; 28/110, 142
See application file for complete search history.

(56) References Cited

U.S. PATENT DOCUMENTS 5,268,076 A 12/1993 Best et al.
5,360,656 A 11/1994 Rexfelt et al.
(Continued)

FOREIGN PATENT DOCUMENTS

EP 2042653 4/2009
WO 2004099496 11/2004

*Primary Examiner* — Eric Hug
(74) *Attorney, Agent, or Firm* — Volpe and Koenig, P.C.

(57) ABSTRACT

A press felt formed of two stacked layers of woven single layer base fabric, each layer being formed by warp yarns interwoven with two systems of weft yarns according to a single layer weave pattern. The layers are needled with a batt layer. In the woven single layer base fabric: a) the warp yarns are polymeric monofilaments arranged as a single layer and there are two systems of weft yarns; b) the first system of weft yarns are formed by cabled polymeric monofilaments and the second system of well yarns are single polymeric monofilaments; c) the cabled polymeric monofilaments are 50% to 85% in one repeat; d) the cabled monofilaments are each formed of at least two monofilaments which are cabled together; and e) at least two of the cabled well yarns in each repeat are adjacent to each other.

26 Claims, 10 Drawing Sheets

(51) Int. Cl.
*D03D 15/00* (2006.01)
*B32B 5/06* (2006.01)
*B32B 5/26* (2006.01)
*D21F 1/00* (2006.01)

(52) U.S. Cl.
CPC ............. *D03D 13/008* (2013.01); *D03D 15/00* (2013.01); *D21F 1/0027* (2013.01); *D21F 7/08* (2013.01); *D10B 2331/02* (2013.01)

(56) References Cited

U.S. PATENT DOCUMENTS

| | | | |
|---|---|---|---|
| 5,508,094 A | 4/1996 | McCarthy et al. | |
| 5,525,410 A * | 6/1996 | Hansen | D03D 15/00 139/383 A |
| 5,618,612 A * | 4/1997 | Gstrein | D21F 7/083 139/383 A |
| 5,651,394 A * | 7/1997 | Marchand | D03D 15/00 139/383 A |
| 6,699,367 B2 | 3/2004 | Gstrein et al. | |
| 7,089,968 B2 * | 8/2006 | Aldrich | D21F 1/0036 139/383 A |
| 7,374,639 B2 | 5/2008 | Ampulski et al. | |
| 7,473,336 B2 | 1/2009 | Hawes et al. | |
| 7,478,655 B2 | 1/2009 | Nakajima | |
| 7,722,743 B2 | 5/2010 | Best et al. | |
| 2005/0167069 A1 | 8/2005 | Kobayashi et al. | |
| 2006/0243338 A1 * | 11/2006 | Hawes | D21F 1/0036 139/383 A |
| 2010/0200188 A1 | 8/2010 | Ogiwara | |
| 2011/0294386 A1 | 12/2011 | Kockritz et al. | |
| 2012/0145349 A1 | 6/2012 | Ogiwara | |
| 2013/0020043 A1 * | 1/2013 | Hedou | D21F 7/08 162/358.2 |

* cited by examiner

PRESS FELT BASE FABRIC EXHIBITING REDUCED INTERFERENCE

CROSS REFERENCE TO RELATED APPLICATION

This application claims the benefit of 61/761,280, filed 6 Feb. 2013, which is incorporated by reference as if fully set forth.

FIELD OF INVENTION

The invention concerns single layer woven industrial textiles intended for use in a two layer stacked arrangement as base fabrics in full width flat woven press felts or in spirally wound multiaxial press felts. It is particularly concerned with such textiles in which at least some of the weft yarns are cabled monofilaments arranged so as to minimize yarn interference patterns in constructions where two such textiles are superimposed.

BACKGROUND

In the manufacture of paper, board and similar cellulosic products, a headbox directs a dilute stock slurry consisting of about 99% water together with about 1% papermaking fibers and other components onto a forming fabric in the forming section of a papermaking machine. The forming fabric serves to provide uniform support for the papermaking fibers while allowing a sufficient portion of the water to drain through so that, upon reaching the end of the forming section, a very wet but cohesive embryonic web of fibers remains. This web is then transferred to the press section of the machine where a further proportion of water is removed by mechanical pressure. As the web is transported through the press section upon or between one or more press felts, it passes, together with the fabrics, through at least one press nip formed between two opposed rolls. Following the press section, the web is then passed to the dryer section where it is conveyed over a series of heated rolls so that the remainder of the water is removed by evaporation.

The press felts play an important role in the papermaking process: they provide a reservoir into which water that is expressed from the web can be carried for subsequent removal, and they provide a uniform, non-marking surface upon which the web is conveyed as it passes through the press nips. Press felts are typically constructed using a woven base fabric into which is needled a number of layers of a relatively fine fibrous batt material; typically, both the base fabric yarns and the batt fibers are comprised of nylon or similar polymer.

Until recently, press felts were made in one of two ways. In the first method, the base fabric was woven endlessly, similarly to a sock or tube so that it did not include a seam, and according to the size required to suit the press section into which it was to be installed. Once this base fabric was completed, layers of batt material were then needled into it and the press felt was then finished according to known methods. When installed, it was slipped over the press section area for which it was made. In the second method, the base fabric was woven flat to the width and length of the final felt, a seam area created at the opposing longitudinal ends, and layers of batt needled onto the base fabric. The base fabric was typically a multilayer weave construction to provide dimensional stability and void volume to the final press felt; the seam area was constructed to allow for joining the fabric on the machine for which it was intended by passing it through the press section while attached to the older fabric it was to replace. Both methods and constructions have been in use for a number of years.

It has more recently been proposed to manufacture press felts using relatively narrow (about 1 m) wide strips of woven base fabric, rather than the prior art base fabrics described above which are woven to the intended full width of the final product. See, for example, U.S. Pat. No. 5,268,076 to Best et al. and U.S. Pat. No. 5,360,656 to Svensson et al. As disclosed in those patents, a continuous narrow woven base fabric strip is spirally wound to provide the desired length and width of the final fabric. This manufacturing method has met with great success because it is now no longer necessary to use very wide industrial looms to manufacture the base fabric as was done previously. Instead, a relatively narrow loom can be used to produce a continuous strip of woven base fabric material which is then assembled according to the spiral winding process in which the longitudinal edges of adjacent turns of the helically wound strips are bonded one to the next by one of various methods.

In the spiraling process, a fabric strip is led from a relatively narrow high speed loom and directed around at least two large diameter rolls set a desired distance apart such that it is canted by a small angle of from about 1° to about 10° to the intended machine direction of the final product. Each successive turn of the fabric strip is laid adjacent to, and bonded to, that previously supplied so as to build up sufficient length and width of a cohesive, tube-like precursor base fabric with no widthwise seam. This precursor base fabric is then removed from the spiral winding apparatus and collapsed onto itself so that fold areas can be formed at the opposed widthwise ends. The fold areas will be used to install a seam at a later point in processing; the collapsed tube, from fold to fold, is now approximately equal to the required length of the final fabric.

When the precursor fabric is flattened in this manner, the spirally wound woven material from each side of the tube is brought into intimate contact with one another. Because the entire base fabric is woven according to the same weave pattern, interference patterns appear at locations where the warp and weft yarns from the opposing surfaces overlap but are not in exact alignment, forming distributed regions of low and high yarn densities throughout the fabric. A press felt made using this base fabric will also have areas of low and high yarn density which, when in use, will cause uneven water removal from the web and thus sheet marking. In addition, adhesion of the batt fibers to the base fabric will be irregular rather than uniform throughout because these fibers will find "better" anchorage in regions of the base fabric where yarn densities are comparatively higher. The press felt will tend to shed batt fibers more quickly during use from those areas where base fabric yarn density is comparatively lower. This in turn will affect the uniformity of the fabric and thus its overall ability to dewater the sheet evenly without imparting a mark to it.

This interference phenomenon in multiaxial press felts (also known as the Moire effect) is well known. WO 2004/099496 to Herring et al. teaches that interference patterns can be eliminated by introducing a degree of randomness into the weave of the fabric by arranging at least a portion of the weft yarns so that they do not follow a linear path. U.S. Pat. No. 7,473,336 to Hawes et al. discloses a base fabric in which machine direction (MD) and cross-machine direction (CD) yarns which are arranged in a predetermined manner such that a distance between one pair of adjacent CD yarns is different than that between another pair of adjacent CD yarns.

While both of these solutions to this problem have met with limited success, neither provides for a press felt base fabric made from a single layer woven structure. Further, it is difficult to employ either technique in a manufacturing environment as both require manipulation of loom settings during production, which is undesirable. Single layer base fabrics are desirable because they will provide for a comparatively lighter press felt than will a similar base fabric made using a double layer weave design, and will possess unique compressive properties which makes them suitable for certain papermaking applications which have relatively low nip intensities and/or are required to handle less water.

Similar problems occur in full width, flat woven press felt base fabrics, which can be produced as two separate full size pieces which are then "socked" one inside the other and then needled together. This construction can also result in interference patterns occurring between the two layers, forming regions of relatively low and high yarn densities as a result of the misalignment of the yarns in the two opposing surfaces, and thus uneven water removal and sheet marking for the reasons previously described.

DISCUSSION OF THE PRIOR ART

Use of cabled monofilaments and other twisted yarn constructions as at least a portion of the machine direction (MD) or cross-machine direction (CD) yarns in woven press felt base fabrics is well known and such use has been employed to improve batt anchorage and fiber retention. For example, U.S. Pat. No. 5,618,612 to Gstrein discloses a full width, flat woven press felt base fabric including fine plied monofilament twist yarns as the CD weft yarns. U.S. Pat. No. 6,699,367 to Gstrein et al. proposes a seamed felt including twisted or braided CD or MD yarns to improve batt adhesion. The yarns are preferably comprised of three monofilaments twisted together.

U.S. Pat. No. 5,525,410 to Hansen discloses a press felt base fabric woven using cabled nylon, polyester or polyurethane monofilaments; there is no disclosure of a specific weft yarn arrangement to minimize or eliminate interference patterns.

U.S. Pat. No. 5,508,094 to McCarthy et al. describes a flat or endlessly woven multilayer press felt base fabric including at least one system of fine monofilament warp, and at least 2 layers of weft, one of which may include polyurethane coated load bearing multicomponent yarns.

U.S. Pat. No. 5,651,394 to Marchand discloses a press felt base fabric woven using oval monofilaments or cabled oval monofilaments oriented in either the MD or CD.

U.S. Pat. No. 7,478,655 to Nakajima describes a multilayer pulp press fabric including as weft yarns chenille, spun, flocked or similar multifilaments.

U.S. Pat. No. 7,473,336 to Hawes et al. discloses a multi-axial press felt having improved pressing uniformity and reduced sheet marking in which either: a) the spacing between the MD and/or CD yarns of the base fabric varies, b) a nonwoven layer is placed between upper and lower woven layers, or c) the mating surfaces of the upper and lower layers is calendared to reduce the height of yarn knuckles and minimize nesting of the yarns.

U.S. Pat. No. 7,722,743 to Best et al. discloses a method of making a nonwoven spirally wound press felt comprised of an MD module and a CD module which are overlaid one on the other.

US patent publication number 2005/0167069 to Kobayashi et al. teaches a press felt base fabric in which one of either the CD or MD yarns is a "twine" (i.e. multifilament), and the other is a single yarn.

US patent publication number 2010/0200188 to Ogiwara discloses a press felt in which at least one of the MD or CD yarns in the paper side surface (PS) of the base fabric is a multifilament yarn; use of this construction in a multiaxial type base fabric is disclosed for the purpose of increasing batt adhesion. US patent publication number 2012/0145349 also to Ogiwara discloses a woven press felt base fabric including additional warp yarns comprised of a material different from that of the remaining base fabric warp yarns such as twisted monofilaments, multifilaments, spun or staple yarns, or yarns of differing size or composition.

European patent publication EP 2,042,653 to Ito discloses a press felt base fabric in which flattened, soft twisted multifilaments are used as either the warp or weft yarns.

None of the prior art discloses a single layer, flat woven or multiaxial press felt base fabric including a specific arrangement of cabled and monofilament weft yarns which is particularly suitable for eliminating yarn interference patterns arising when two (or more) layers of the single layer fabric are overlaid one upon the other during press fabric manufacture.

SUMMARY

A press felt is provided having two stacked layers of a woven single layer base fabric, with each of the layers being formed by a system of warp yarns interwoven with first and second systems of weft yarns according to a chosen single layer repeating weave pattern. The two stacked layers are needled with at least one batt layer. The woven single layer base fabric includes the following features:

a) The warp yarns of the system of warp yarns are polymeric monofilaments arranged as a single layer and are interwoven with the weft yarns in the two systems of weft yarns;

b) The weft yarns of the first system of weft yarns comprise cabled polymeric monofilaments (henceforth "cabled yarns") and the weft yarns of the second system of weft yarns comprise single polymeric monofilaments (henceforth "monofilaments");

c) The cabled yarns comprise from 50% to 85% of the weft yarns while the monofilaments are from 50% to 15% of the weft yarns in one repeat of the base fabric weave construction;

d) The cabled yarns are each comprised of at least two monofilaments which are cabled together; and e) at least two of the cabled yarns in each repeating yarn sequence are adjacent to each other.

The press felt can be a seamed press felt formed from two separate ones of the single layer base fabric which are stacked together, each of which is woven to provide pieces of a desired length and width for the press felt. Alternatively, the press felt can be a seamed, spirally wound, multiaxial press felt including the woven single layer base fabric as a strip that is spirally wound with each adjacent turn being joined to its neighbor to form a tube that is collapsed to form the two stacked layers having a desired width and length for the press felt. As a further alternative, the press felt can be formed in either configuration but without a seam. In any case, at least one layer of batt is needled to the base fabric.

Preferably, the cabled yarns are each comprised of 2 monofilaments that are cabled together with two monofilaments which are also cabled together (i.e.: 2×2).

Preferably, the monofilaments and cabled yarns of the two weft yarn systems are arranged according to a pattern that provides an irregularly spaced yarn sequence, and more preferably the two weft yarn systems are arranged in an irregular repeating yarn sequence or order in the base fabric weave pattern. One preferred yarn sequence that results in irregular spacing of the weft yarns is MMCC (where M=single monofilament and C=cabled yarn). Additional preferred sequences that provide irregularly spaced weft yarns as well as an irregularly repeating yarn sequence include: MCMCC or MCMMCCMCC, or other irregular arrangements of these weft yarns in the woven fabric strip in which the cabled yarns comprise 50% to 85% of the weft yarns and the monofilaments comprise between 50% and 15%, and at least two of the cabled yarns in each repeating sequence are adjacent to each other.

Preferably, the irregular repeating yarn sequence of the weft yarns in the fabric weave is MCMCC. Alternatively, the irregular repeating yarn sequence of the weft yarns is MCMMCCMCC (or the like). As used herein, the term "repeat" refers to the irregular repeating order or sequence of the monofilaments and cabled yarns used as the weft in the base fabrics of the invention.

Preferably, every cabled yarn is immediately adjacent to at least one monofilament, and every monofilament is immediately adjacent to at least one cabled yarn. Preferably, the center line to center line first distance between any two adjacent yarns in one repeat differs from a corresponding second distance between a second different set of adjacent yarns in the repeat, with both the first and second distances being different than a third distance between a third different set of adjacent weft yarns in the repeat. Generally speaking, if the average distance between all of the weft yarns in one repeat of the weft yarns in the single layer woven base fabric is taken to be a theoretical 100% spacing, then the center line to center line distances between any two adjacent weft yarns will vary (e.g. if the average yarn spacing =100%, yarn spacing will be, for example, 105%, 140%, and 75% of this distance).

Preferably, the smallest spacing is less than the average spacing by 10% or more, and preferably, the largest spacing is greater than the average spacing by 10% or more.

We have found that, by carefully selecting the order in which the cabled yarns and single monofilaments are arranged in each repeat of the woven base fabric, and the fabric knocking, it is now possible to significantly reduce or completely eliminate the interference effect common to both flat woven and multiaxial type press fabrics which are either seamed or endless. In particular, by including cabled yarns as 50% to 85% of the weft yarns, and by arranging them in an irregular repeating manner in the fabric so that at least two of the cabled yarns in each repeat are adjacent to each other. For example, in a group of five successive weft yarns, where the yarns are arranged in a specific order, in one instance: monofilament (M), cabled yarn (C), monofilament (M), cabled yarn (C), cabled yarn (C), then significant reduction or elimination of interference patterns caused by overlaying two single layer base fabrics in the construction of a press felt can be obtained.

This is because the yarn to yarn spacing between any two adjacent weft yarns will differ in the woven cloth due to the differing yarn diameters of the monofilaments in comparison to cabled yarns, and their crimping behavior (due to their differing bending stiffnesses). We have found that, when the order of the cabled yarns and monofilaments in the repeat is made irregular, these factors combine to present an irregular spacing of the weft yarns in the overall fabric which will act to reduce or eliminate any interference pattern in the assembled cloth. Further, if these weft yarns are included in the fabric at a relatively high knocking, of from at least 8 yarns/cm (20.3 yarns/in.) to as much as 12 yarns/cm (30.5 yarns/in.) or more depending on the intended application, then the aforementioned benefits can be obtained. In one preferred embodiment, when the above mentioned yarn order is employed, satisfactory results are obtained when the weft yarn knocking is about 9.4 yarns/cm (23.9 yarns/in.) of fabric length. As used herein, the term "knocking" refers to numbers of weft yarns per unit length of woven fabric.

In one embodiment for a single layer woven fabric for use as a base fabric in a full width flat woven or multiaxial press felt, the fabric construction exhibits low to zero interference patterns by virtue of the following features:

a) Single layer plain weave construction, b) 50% to 85% of the CD (weft) yarns are cabled 2×2 yarns arranged as follows:

c) an irregularly spaced yarn sequence and/or an irregular repeating yarn sequence, such as MCMCC, MMCC, or MCMMCCMCC (where M=monofilament and C=cabled yarn), d) Monofilaments comprising the cabled yarns are 0.2 mm in diameter (=0.2×2×2), e) The remaining 50% to 15% of CD (weft) yarns are 0.3 mm diameter monofilaments, f) The MD monofilaments are 0.4 mm in diameter, g) The fabric is woven at a knocking of from about 8 yarns/cm (20.3 yarns/in.) to as much as 12 yarns/cm (30.5 yarns/in.), h) The base fabric is assembled according to either known spiraling techniques or full width flat woven techniques to form a double layer construction (i.e. sock is collapsed);

i) The warp yarns are optionally exposed at lateral ends to form seaming loops; and j) A regular/customary batt is needled to the base fabric according to known techniques.

The resulting fabric exhibits improved uniformity of batt fiber distribution, batt adhesion to the base fabric and fiber locking (which will lead to improved visual appearance and longer felt life). A further benefit is faster break-in and improved pressure uniformity in comparison to similar fabrics which do not have this construction. Another benefit is higher void volume when compared to press felts having a base fabric comprising 100% cabled yarns in either of the MD or CD directions.

Press felts made using base fabrics of the inventive construction exhibit improved uniformity in comparison to prior art fabrics due to the elimination of interference effects created when two layers of such textiles are overlaid one upon the other during manufacture of the press felt.

Preferably, each of the individual monofilaments comprising the first weft yarn system comprising cabled yarns is circular in cross-section and has a diameter of about 0.2 mm. Preferably, the individual yarns of the second weft yarn system comprising single monofilaments are also circular in cross-section and have a diameter of about 0.3 mm. However, depending on need, it would also be possible to use in either weft yarn system yarns whose cross-sectional shape and size or diameter would be greater or less than these values.

Preferably, the diameter of the monofilaments comprising the warp yarn system is about 33% greater than the diameter of the monofilaments of the second weft yarn system. More preferably, the diameter of the warp yarns is about 0.4 mm. If the diameter or size of the monofilaments in the second weft yarn system is adjusted according to need, then it would be necessary to increase or decrease the diameter or size of the warp yarns accordingly.

Preferably, the inventive base fabrics are woven to a knocking of at least about about 8 yarns/cm (20.3 yarns/in.) and may range as high as 12 yarns/cm (30.5 yarns/in.), or more, depending on need. Preferably, the knocking is at least about 9 yarns/cm (23 yarns/in.), and more preferably is about 9.4 yarns/cm (23.9 yarns/in.).

Preferably, the gap or spacing between any two adjacent yarns differs from that on either side of each of those yarns.

Preferably, the polymer from which the polymeric monofilaments used in the fabrics of this invention are formed is a polyamide (PA). More preferably, the polyamide is one of PA-6, PA-6/6, PA-6/10, PA-6/11, or PA-6/12. It would also be within the scope of the invention to use warp material made from a different polyamide than either of the single or cabled weft yarns.

Preferably, the base fabrics of the invention are woven according to a plain weave, as it has been found that this construction provides for the most stable cloth which is easily seamed; other weave patterns however, may prove suitable.

Preferably, in the woven fabric, the yarn to yarn separation (or spacing) between the individual weft yarns of each of the two weft yarn systems is irregular and the fabric knocking is at least about 8 yarns/cm (20.3 yarns/in.) and is preferably about 9.4 yarns/cm (23.9 yarns/in.). More preferably, the yarn to yarn separation is irregular and there exist at least three different separation distances between the adjacent weft yarns in one repeat, which separation distance varies by at least ±10% of the average yarn separation distance in one repeat of the weft yarns. Still more preferably, the yarn to yarn separation distance varies by from about 75% to about 140% of the average yarn separation in one repeat of the weft yarns. It is noted that these criteria apply to the finished fabric; the yarn to yarn spacing between the individual wefts is not mechanically adjusted during the weaving process; the spacing changes due to the size difference and stiffness (thus crimp behavior) between the cabled yarns and monofilaments. As the warp pass over & under the weft under tension, the cabled yarns crimp more than the monofilaments; depending on the type of yarn ahead of a given yarn, this will combine to impact the yarns spacings between the two. That is why there is a relatively large distance between 2 cabled yarns, and a smaller distance between a cabled and a monofilament, and that distance varies depending on whether the cabled yarn is "ahead" or behind the monofilament—see distances A and C in FIGS. 5 and 9].

Preferably, in the press felts assembled using the base fabric of the invention, at least two base fabric layers are overlaid one on the other so that, together, the warp and weft yarns of the first layer and the warp and weft yarns of the second layer are arranged to provide a plurality of openings, each of which is in the shape of an elongated diamond shaped quadrilateral when viewed from a direction normal to the plane of the base fabric, the quadrilateral having a short axis across its width and a long axis along its length.

Preferably, the perimeter of at least some of the plurality of quadrilaterals includes at least two cabled yarns located so as to form two of its four sides; more preferably, the perimeters of at least a portion of the plurality of elongated diamond shaped quadrilaterals includes three cabled yarn. Preferably, the perimeter of at least a portion of each of the plurality of elongated diamond shaped quadrilaterals includes at least four cabled yarns located so as to form each of its four sides.

Preferably, the width of the quadrilateral at the short axis is between about 0.2 mm and 0.6 mm.

Preferably, at least a portion of the warp yarns of the base fabric strip are used to form a fabric seam in the press felt.

DETAILED DESCRIPTION OF THE DRAWINGS

Figure 1:
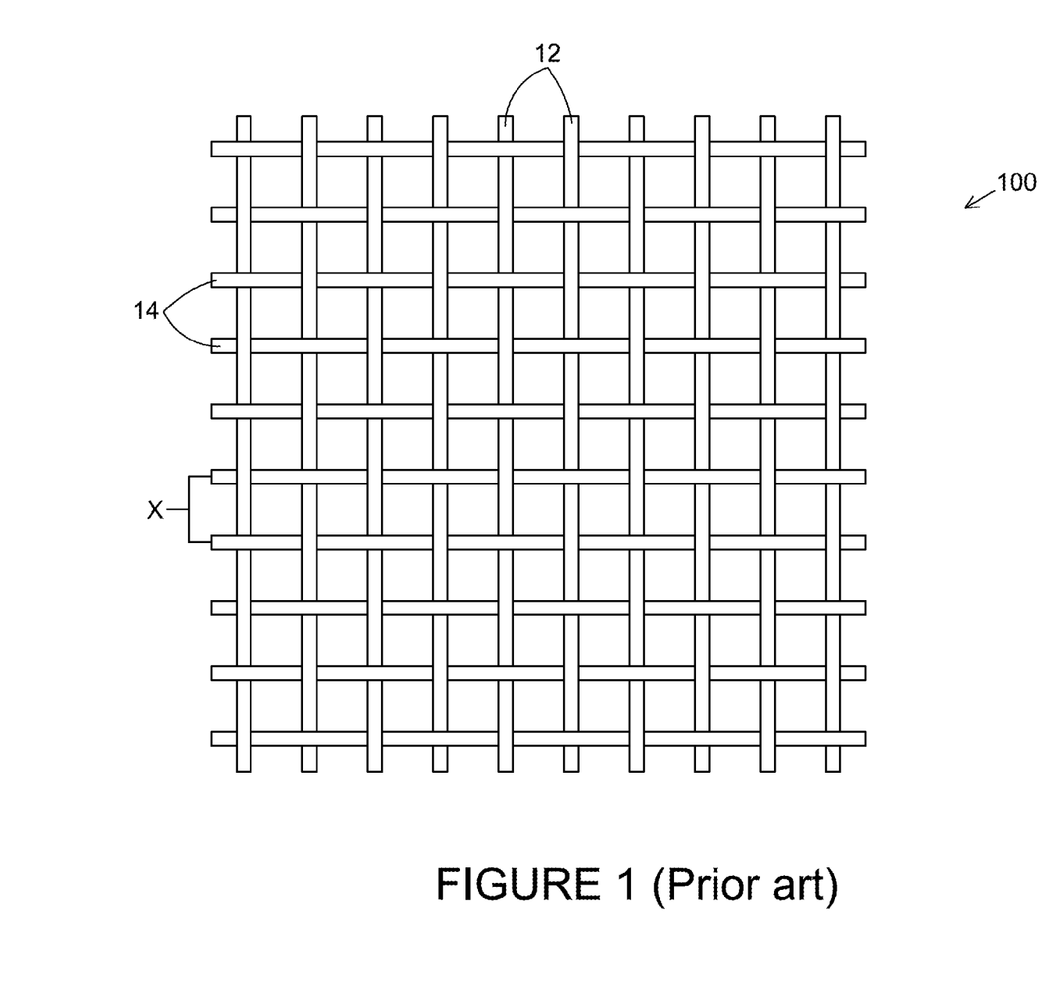
FIG. 1 is an illustration of a portion of a prior art single layer base fabric.

In the assembly of known spirally wound press felts (henceforth "multiaxial") or flat woven press felts of double layer construction including one single layer fabric socked inside the other (henceforth "flat woven"), the base fabric such as 100 in FIG. 1 is woven from single monofilament warp yarns 12 and single monofilament weft yarns 14 according to a plain weave as shown, or other desired pattern as may be suitable for the intended end use. In multiaxial fabrics, the base fabric 100 is spirally wound as a narrow strip to provide the desired length and width required for the finished fabric to form a tubular sock-like structure which is flattened upon itself to form two stacked layers; in flat woven structures, two layers of the base fabric 100 are each separately woven to the desired width and length and then inserted one inside the other. In FIG. 1, the distance X indicates the regular, yarn-to-yarn spacing of the single monofilament weft yarns 14 in the prior art single layer base fabric 100 which spacing continues throughout the length of the woven base fabric. When the assembled base fabric is intended as a double layer structure, it is common to overlay two layers of the single layer base fabric 100 in the manner shown in FIG. 2.

Figure 2:
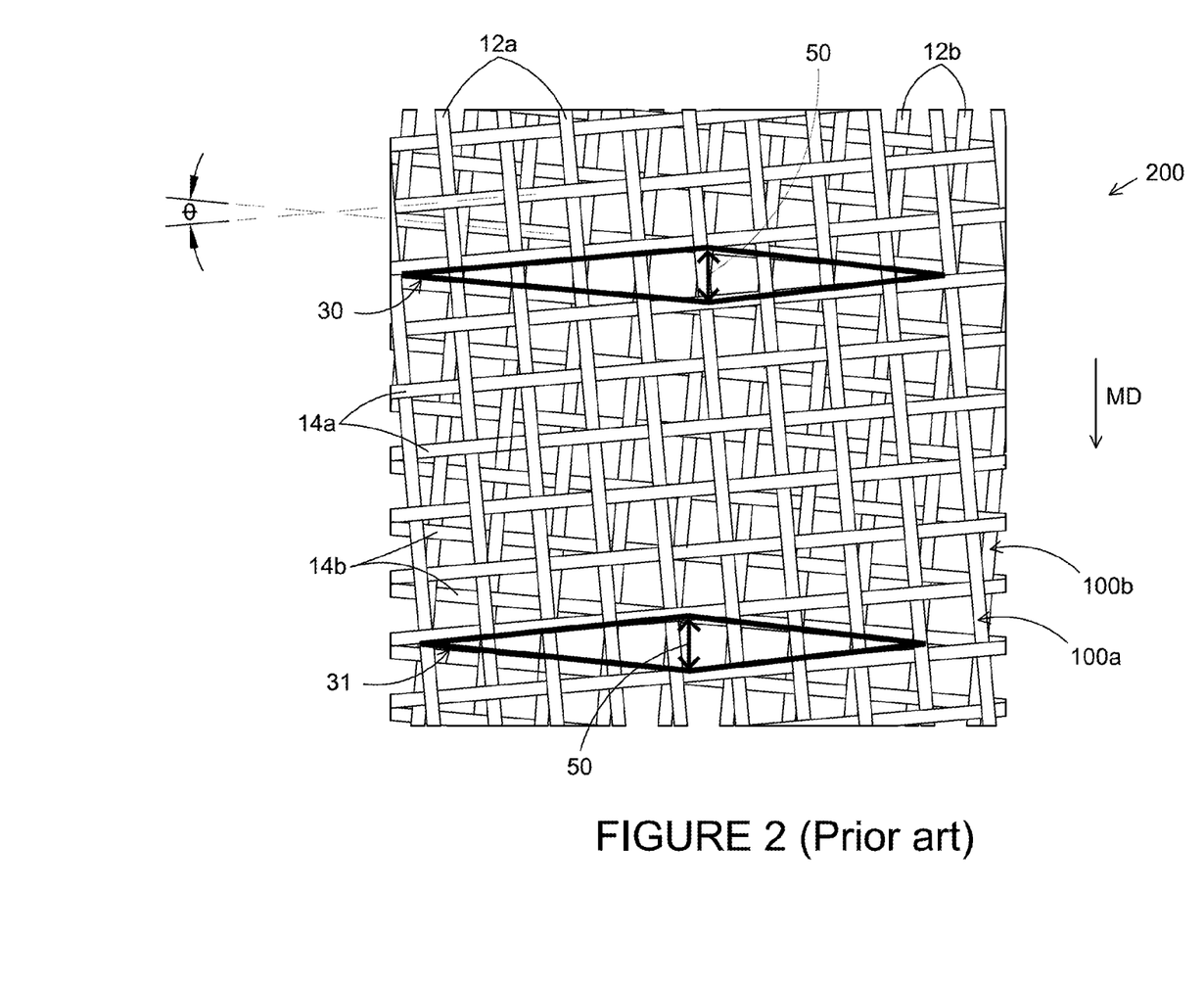
FIG. 2 is a representation of a portion of a prior art double layer press felt base fabric including two overlaid layers of the single layer base fabric shown in FIG. 1.
Figure 4:
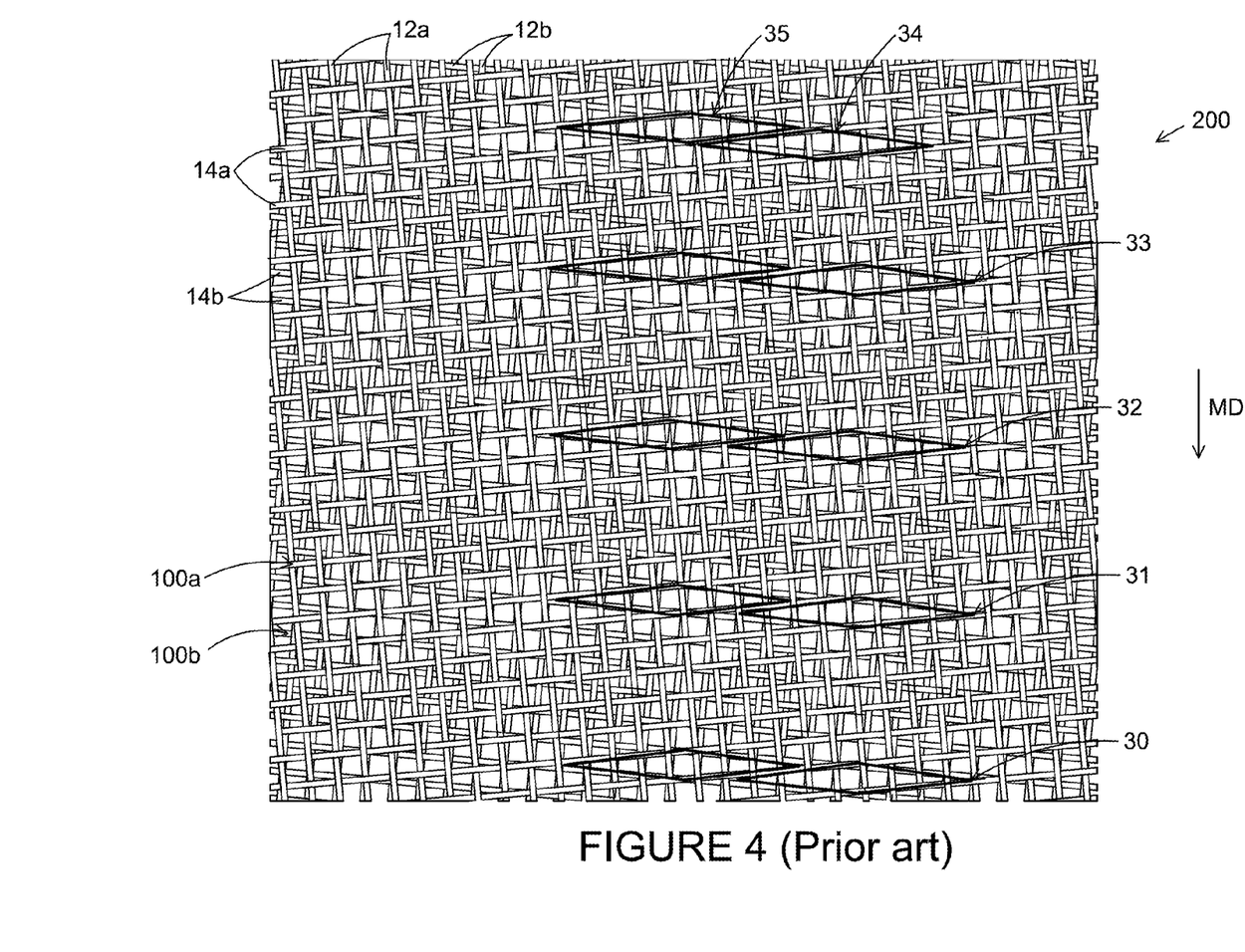
FIG. 4 is a depiction of the interference patterns generated across a larger area of the base fabric presented in FIG. 2.

FIG. 2 illustrates the arrangement of the warp and weft yarns 12a, 14a in a first fabric layer 100a when assembled together with warp and weft yarns 12b, 14b of a second fabric layer 100b to form double layer fabric 200 which may be either a flat woven or multiaxial construction. During assembly, the warp yarns 12a may be canted, or tilted, at a small angle that is from about 1° to about 10° to the intended machine direction (MD) of the final fabric, while in the second layer, the warp yarns 12b may be canted at a similar but opposite angle to the MD. Since the weft yarns 14a, 14b in each layer 100a, 100b are woven perpendicularly to the warp yarns and are spaced at a constant regular distance X each from the next, they are thus oriented at an angle Θ to one another due to the cant angles of the warp yarns and form elongated diamond shaped quadrilateral openings such as 30 and 31. These openings recur regularly across the entire width and length of the assembled fabric as shown in FIG. 4. The interior of each opening 30, 31 has fewer yarns 12a, 12b, 14a, 14b than the surrounding regions and each opening is bordered on all four sides by monofilament yarns 14a, 14b.

In prior art double layer base fabrics such as 200, both the warp yarns 12a, 12b and weft yarns 14a, 14b are usually single strand polyamide monofilaments of circular cross section with diameter of about 0.4 mm woven according to a plain weave pattern at a knocking of about 8 yarns/cm (20 yarns/in.), which is typical for these fabrics. At this yarn density, and when single monofilaments are used and arranged at a regular weft yarn spacing X, the quadrilateral openings 30, 31 shown in FIG. 2 measure about 0.86 mm across their shorter axis 50. When batt (not shown) is needled into the base fabric 200 during subsequent assembly steps, entanglement and anchorage of the batt fibers over the openings 30, 31 will be poorer in comparison to the anchorage obtained in areas where the yarn density is higher and the openings between the adjacent base fabric yarns are smaller. During use, a press fabric made using a base fabric such as 200 will tend to shed batt fibers more readily adjacent these open areas 30, 31 in comparison to other regions of the fabric where yarn densities are higher.

Figure 3:
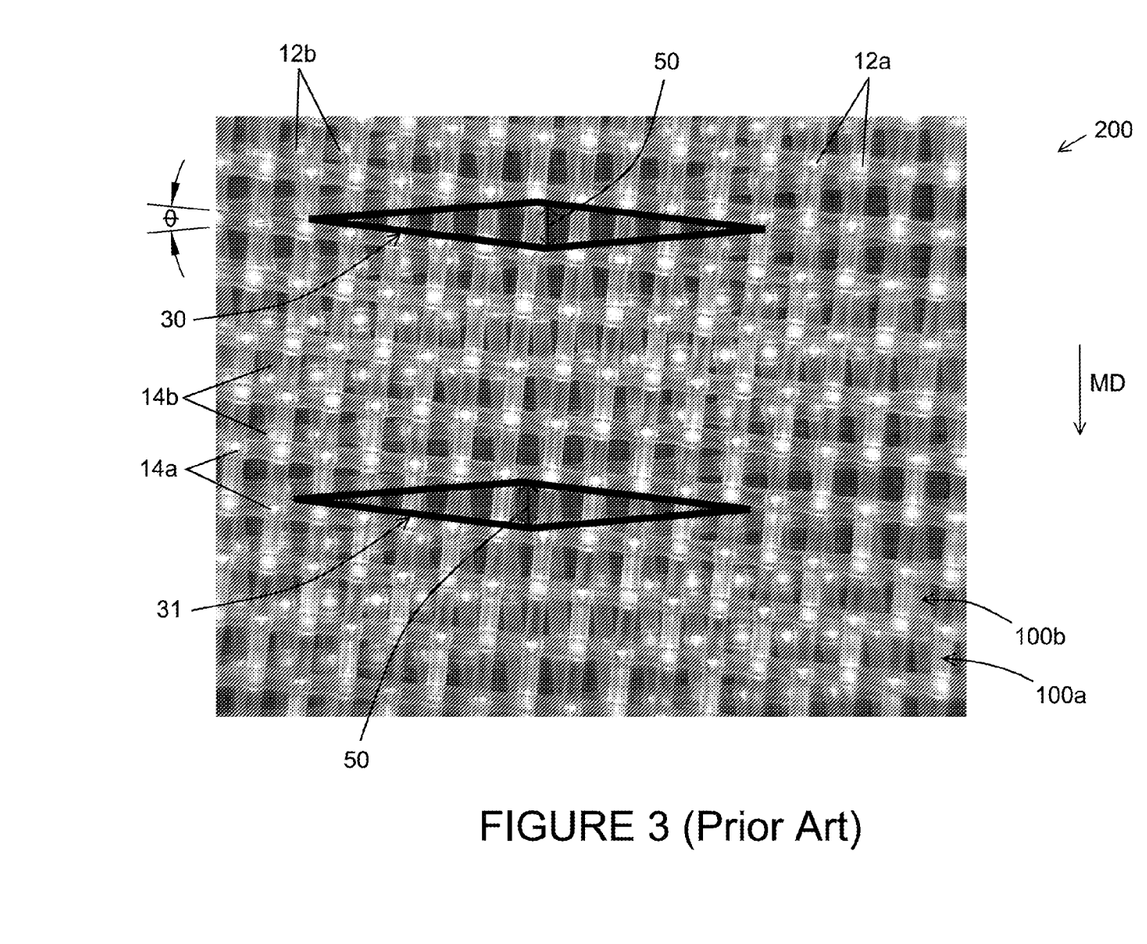
FIG. 3 is a photograph showing a portion of a prior art double layer base fabric arranged in the manner shown in FIG. 2.

FIG. 3 is a photograph of a prior art double layer base fabric 200 that is assembled from two single layer base fabrics 100a, 100b each constructed in the manner shown in FIG. 1 so that they (and their component yarns) are canted relative to one another at an angle Θ as illustrated in FIG. 2. In FIG. 3, like parts are identified using the same numbering as in FIG. 2. The yarn interference pattern forming the low yarn density openings 30, 31 (and corresponding higher yarn density areas) is clearly visible and is reproduced for clarity over a larger region of the fabric 200 in FIG. 4.

FIG. 4 is an illustration of a larger area of the double layer base fabric 200 shown in FIGS. 2 and 3 including a plurality of elongated diamond shaped quadrilateral openings, a portion of which are indicated as 30, 31, 32, 33, 34 and 35. It is readily apparent from FIG. 4 that the interference pattern created by the superposition of two layers of fabric 100a, 100b having an identical weave pattern, yarn size and spacing will cause a plurality of openings 30 to 35 to form across the width and length of resulting fabric 200 which, when used in a press felt, will be evidenced as marks imparted to the sheet due to uneven water removal caused by variations in batt fiber density.

What is needed, therefore, is a yarn arrangement which will increase the amount of available batt anchorage sites, disrupt the regularity of the elongated diamond shaped quadrilateral openings (i.e. the interference pattern), and decrease their size in the resulting double layer fabric. The present invention uniquely addresses these needs.

Figure 5:
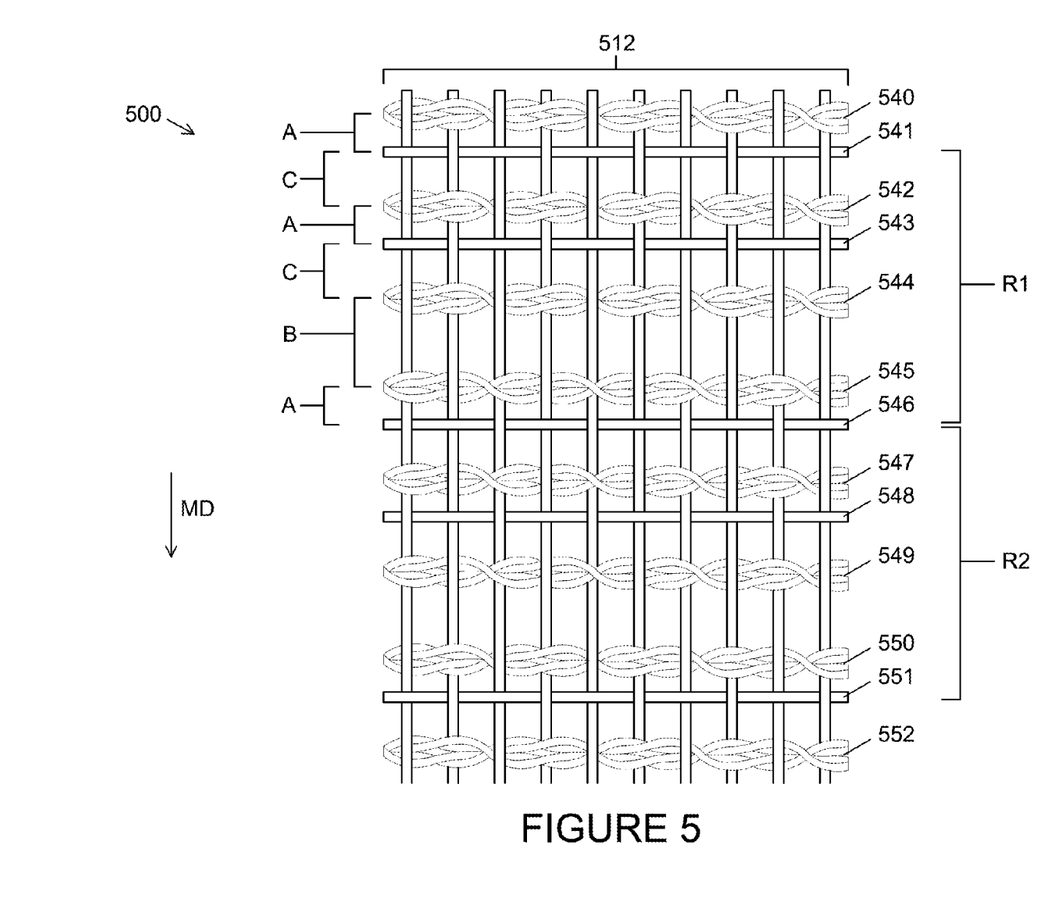
FIG. 5 is an illustration of a portion of a single layer woven base fabric according a first embodiment of the invention.

FIG. 5 is an illustration of a portion of a single layer woven base fabric 500 according to a first embodiment of the present invention including two full repeats R1 and R2 of the novel weft yarn arrangement. A photograph of this fabric is presented in FIG. 6. In fabric 500, the warp yarns 512 are single polymeric monofilaments arranged vertically, while the weft yarns numbered sequentially 540 to 552 are arranged horizontally and comprise a first system of cabled yarns 540, 542, 544, 545, 547, 549, 550 and 552 and a second system of monofilaments 541, 543, 546, 548 and 551. As shown, the monofilaments and cabled yarns are arranged according to an irregular repeating MCMCC sequence, where M indicates a single monofilament yarn, and C indicates a cabled yarn; two repeats are shown.

Beginning at the top of FIG. 5, in a first repeat R1, the weft yarns include monofilament 541, followed by cabled yarn 542, followed by monofilament 543, followed by two cabled yarns 544 and 545. This same sequence is repeated in the immediately adjacent second repeat R2 which includes monofilament 546, followed by cabled yarn 547, monofilament 548, and two cabled yarns in succession 549 and 550. The weft yarn arrangement of repeats R1 and R2 recurs in this manner throughout single layer fabric 500. In each repeat R1 and R2, the space or gap A, B and C indicating the center line to center line spacing separating any two successive yarns in either direction is not equal (i.e.: A≠B≠C).

Figure 6:
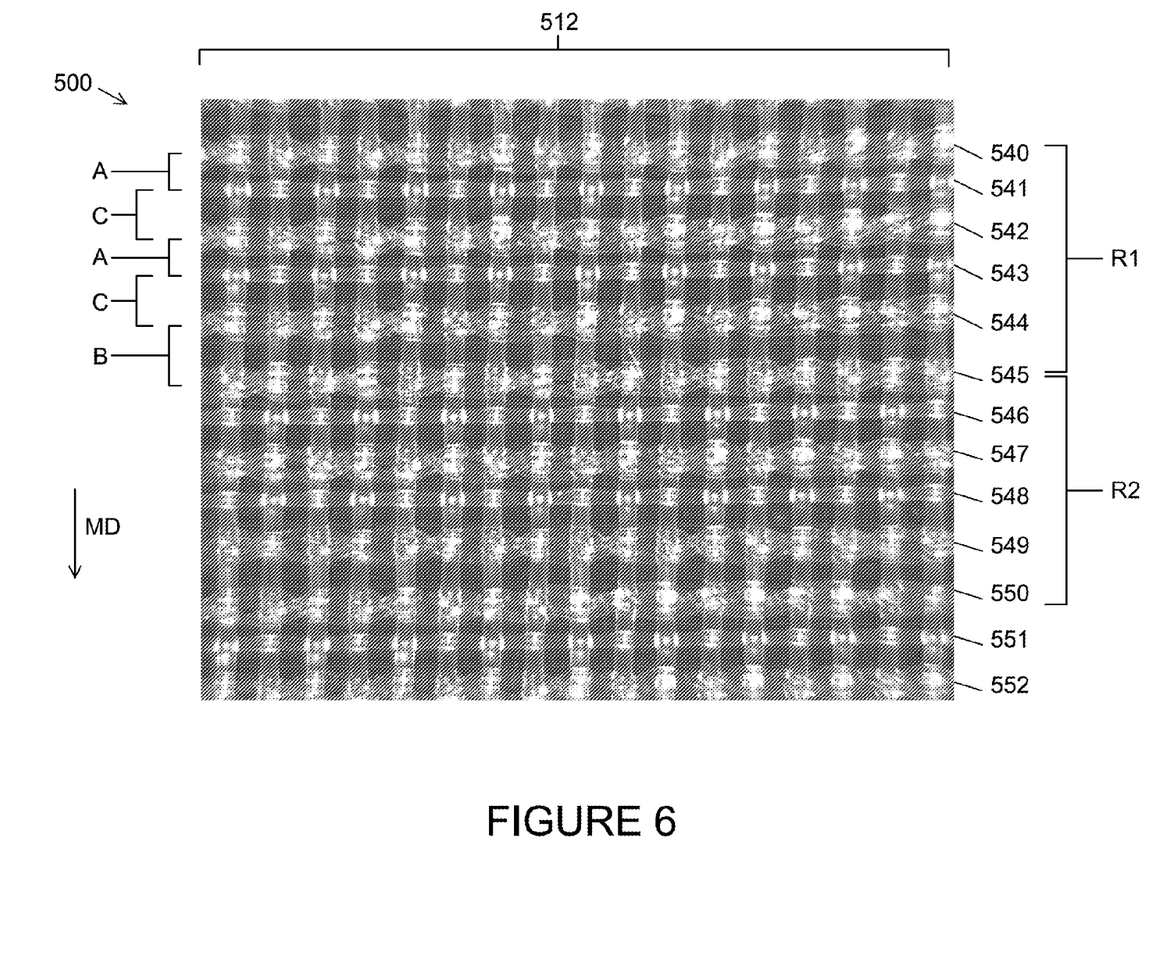
FIG. 6 is a photograph of a portion of a single layer base fabric according to the embodiment shown in FIG. 5.

In each repeat of the weft yarn arrangement of the first embodiment shown in FIGS. 5 and 6, it can be seen that there are three distinct distances between the center lines of adjacent pairs for each of the five weft yarns in the repeat R1. Space or gap C occurs between monofilament 541 and cabled yarn 542; gap A, which is the smallest of the three gaps, occurs between cabled yarn 542 and monofilament 543. Gap C recurs between single monofilament 543 and cabled yarn 544. Gap B, which is the largest of the three spaces, occurs between adjacent cabled yarns 544 and 545. This is followed by a gap A between cabled yarn 545 and monofilament 546. The weft yarn arrangement of R1 then repeats in R2. Gap C is intermediate in size between the two previously indicated gap sizes A and B. Preferably, the smallest space or gap A is less than the average by 10% or more, and preferably, the largest gap B is 10% or more greater in size than the average space.

The differing gap sizes A, B and C occur in each repeat such as R1 because of the different sizes of each of the cabled yarns and monofilaments, their stiffness or relative flexibility as the warp yarns interweave with them, and their position in the repeat. It is known that a cabled yarn such as 542, 544, 545 is less stiff, and thus more flexible, than a monofilament such as 541, 543 and 546. When interwoven by warp yarns, the cabled yarns will tend to bend or crimp to a greater degree than the monofilaments, causing them to appear as if pushed closer to an immediately adjacent yarn, forming a small gap such as A between yarns 540 and 541, or 542 and 543 in FIG. 5. This differing crimping behavior acts in the same manner to form the gaps B and C between two cabled yarns 544 and 545, and between a monofilament and cabled yarn 541 and 542, or 543 and 544. The repeating sequence of monofilaments and cabled yarns utilizes this feature to provide three differing gaps or spaces between the yarns of each repeat to introduce sufficient randomness in yarn spacing to minimize interference. The repeating yarn sequence further ensures each elongated quadrilateral opening in a double layer construction such as shown in FIG. 7 is surrounded on at least two, and as many as all four sides, by cabled yarns.

In one preferred embodiment, if the five gap sizes between the five yarns indicated in the repeat R are summed and their average computed, and that average is taken to be a theoretical 100% spacing, then gap A would be, for example 75% of that average (i.e. it is 25% smaller than the average yarn to yarn center line spacing), gap B would be 140% of that average spacing (i.e. 40% larger than the average), while gap C would be 105% of the average spacing. It can also be seen that, for any given yarn in the repeat, the space or gap between that yarn and the yarn on either side is always different. We have found that this unique, irregular yarn arrangement is effective to reduce and substantially eliminate yarn interference in the assembled fabric. We have also found that, because the weft yarns are comprised of two systems of weft yarns, namely cabled monofilament yarns and single monofilament yarns, the arrangement is particularly effective to both eliminate yarn interference and increase batt adhesion during use because of the increased number of anchorage locations now available in the inventive structure.

FIG. 6 is a photograph of a portion of a single layer base fabric 500 according to the first embodiment of the invention and which is illustrated for clarity in FIG. 5. In FIG. 6, the warp yarns 512 are arranged vertically across the photograph, while the weft yarns are arranged horizontally and are numbered sequentially from 540 to 552 inclusive. FIG. 6 shows two repeats of the weft yarn arrangement R1 and R2 described in relation to FIG. 5. FIG. 6 also shows the gaps A, B and C between the weft yarns 540 to 552 each of which is a different size from the other. It should be noted that the weft yarns 540 to 552 are all woven at the same knocking of 9.4 yarns/cm (23.9 yarns/inch); however, during weaving, these yarns tend to move or shift differently from one another depending on their location in the fabric as previously discussed. This introduces a level of randomness into the spacing of the weft yarns in the single layer fabric of the invention which is not possible in prior art all-monofilament, or alternating monofilament and cabled yarn arrangements, which are woven at the same knocking. In FIG. 6, the warp yarns 512 are 0.4 mm diameter polyamide monofilaments, the cabled yarns 50, 542, 544, 545 are cabled pairs of 0.2 mm diameter polyamide monofilaments cabled (i.e.: 0.2×2×2) while the monofilaments 541, 543, 546 are 0.3 mm in diameter.

Figure 7:
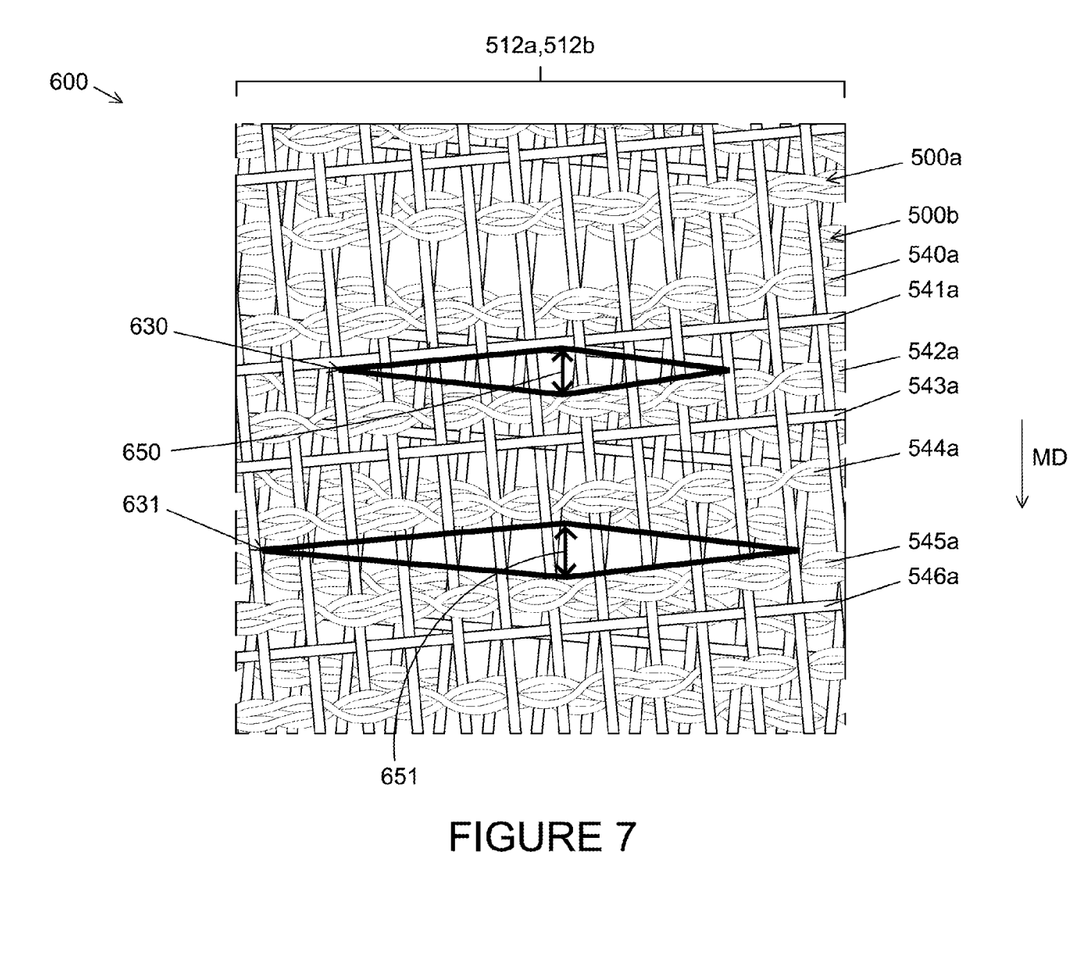
FIG. 7 is a representative illustration of a portion of a double layer base fabric assembled from two layers of the fabric shown in FIGS. 5 and 6.

FIG. 7 is an illustration of a double layer base fabric 600 according to the invention comprising two single layer fabrics 500a, 500b such as are described in relation to FIGS. 5 and 6. As shown in FIG. 7, fabric 500a is overlaid on top of fabric 500b. For clarity, only one repeat of fabric 500a including weft yarns 540a to 546a is indicated and includes monofilament 541a, followed by cabled monofilament 542a, monofilament 543a, and cabled yarns 544a and 545a. Fabric layer 500a is canted relative to fabric layer 500b and elongated diamond shaped quadrilateral openings shaped openings such as 630, 631 are formed throughout the assembled fabric 600.

The perimeter of quadrilateral 630 is formed by cabled yarn 542a and monofilament 541a from fabric layer 500a; the remaining two sides are formed by a monofilament and cabled yarn from fabric layer 500b which is located beneath layer 500a. The short axis of quadrilateral 630 is identified as 650. The perimeter of quadrilateral 631 includes four cabled yarns, two of which 544a and 545a are from fabric layer 500a and the remaining two from fabric layer 500b; its short axis is identified as 651. A fabric was woven according to the yarn arrangement illustrated in FIG. 7 and a photograph of this fabric is shown in FIG. 8.

Figure 8:
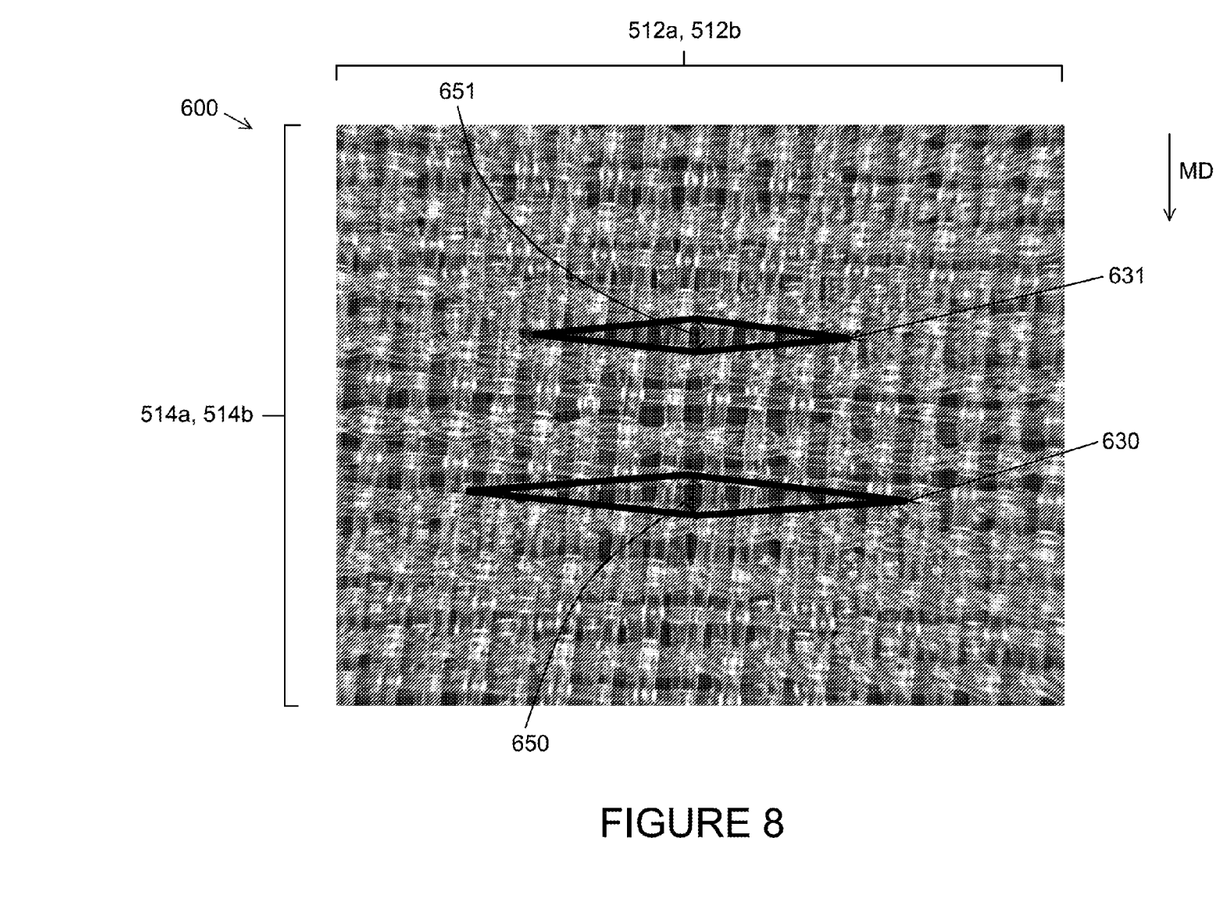
FIG. 8 is a photograph of a portion of a double layer fabric assembled in the manner shown in FIG. 7.

As shown in FIG. 8, a fabric 600 which is formed using the warp and weft yarn arrangement presented in FIG. 7 from two single layer fabrics such as are shown in FIGS. 5 and 6 is presented in which the weft yarns are arranged according to the MCMCC repeat previously discussed so that at least 55% of the component yarns are cabled monofilaments and the remaining 45% are single monofilaments. The size and shape of these weft yarns may be adjusted according to need; we have found that the aforementioned yarn sizes and arrangement are particularly suitable.

As shown in FIG. 8, the long axis of elongated diamond shaped quadrilateral opening 630 is bordered on one side by two monofilaments and on the other side by two cabled monofilaments such that the two monofilaments define the full length perimeter of the shallow "V" shaped area of the opening and the two cabled monofilaments form the full length perimeter of the opposite side. The perimeter of opening 631 however, is formed by cabled monofilaments arranged along all four sides. In fabrics assembled according to the arrangement shown in FIGS. 7 and 8, the length of the short axis 650 may range from about 0.51 mm for openings such as 630 whose perimeter is formed by two single monofilaments and two cabled yarns, to about 0.26 mm for short axis 651 in openings such as 631 which are bordered on all four sides by cabled yarns. These openings 630, 631 are less frequent than in the prior art fabrics, and the size of the openings, as defined by the short axis lengths, are also an improvement and have been found to be acceptable.

Figure 9:
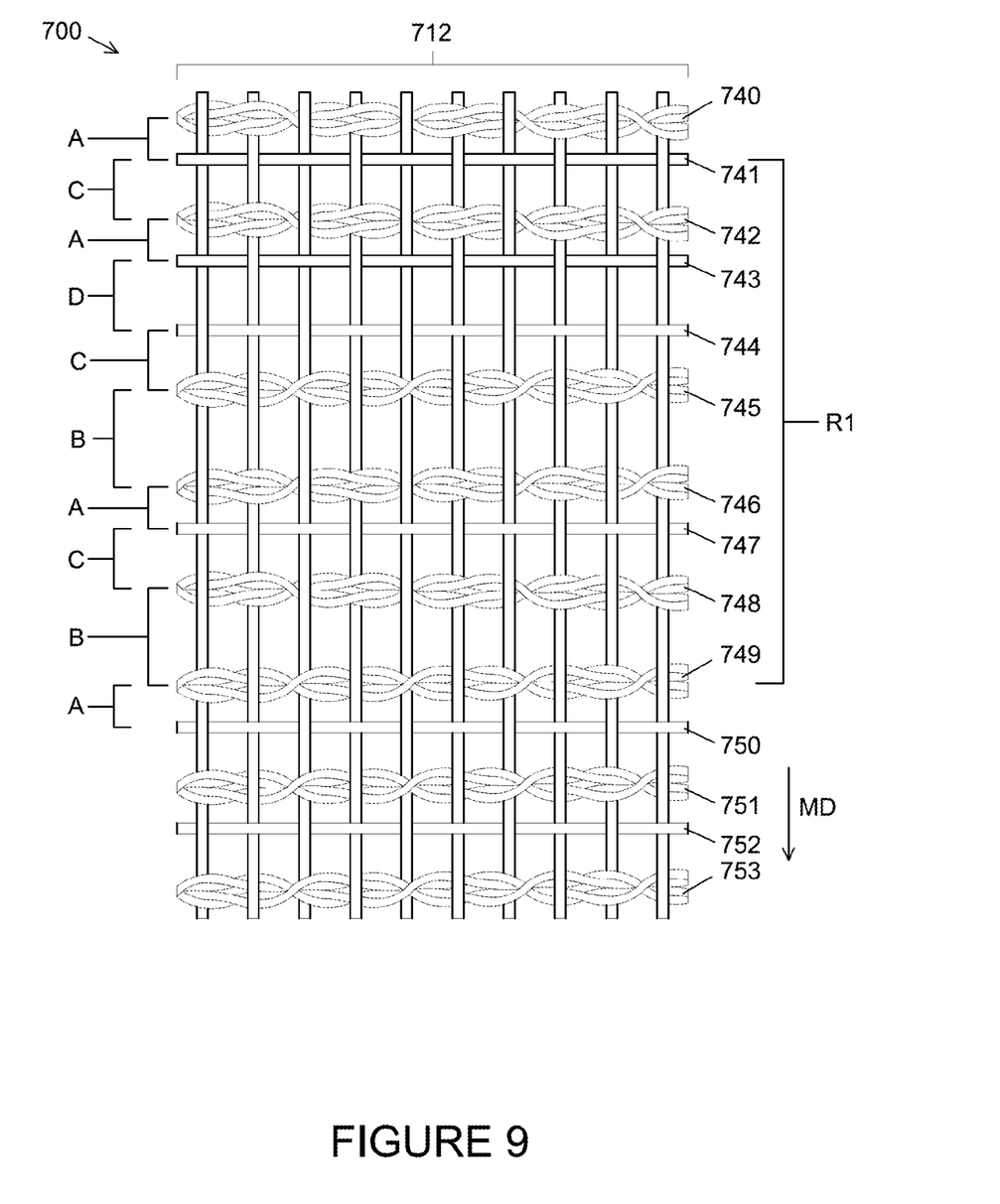
FIG. 9 is an illustration of a portion of a single layer woven base fabric according a second embodiment of the invention.

FIG. 9 is an illustration of a portion of a single layer woven base fabric 700 according to a second embodiment of the present invention. In fabric 700, the warp yarns 712 are arranged vertically parallel to the arrow labeled MD while the weft yarns, consisting of two systems of yarns numbered sequentially 740 to 753 and comprising single monofilaments such as 741, 743, 744, 747, 750 and 752, and cabled yarns 740, 742, 745, 746, 748, 749, 751 and 753 are arranged horizontally across the page, at right angles to the MD. One repeat of the weft yarn arrangement is indicated at R1 and includes nine yarns numbered 741 to 749 arranged according to a second irregular repeating sequence represented as MCMMCCMCC, where M indicates a monofilament, and C indicates a cabled yarn.

Beginning at the top of FIG. 9, one repeat R1 of the alternate weft yarn includes monofilament 741, followed by cabled yarn 742, two monofilaments 743 and 744, followed by two cabled yarns 745 and 746, monofilament 747, and two cabled yarns 748 and 749. This same arrangement is repeated in the immediately following R1 beginning with monofilament 750, followed by cabled yarn 751, single monofilament 752, cabled yarn 753, and so on in the same manner as shown in R1. This weft yarn arrangement repeats over 9 weft yarns and recurs in this manner throughout single layer fabric 700. Further, it can be seen that the space separating any two successive yarns in either direction is not constant as indicated by the bracketed gaps A, B, C and D which indicate the center line to center line spacing between adjacent ones of the monofilaments and cabled yarns in the repeat R1 of fabric 700. In this second embodiment, two monofilaments 743 and 744 are arranged following one another to form gap D. As previously discussed, if the eight gap sizes between the nine yarns indicated in the repeat R1 are summed and their average computed, and that average is taken to be a theoretical 100% spacing, then gap A would be, for example 75% of that average (i.e. it is 25% smaller than the average yarn to yarn center line spacing), gap B would be 140% of that average spacing (i.e. 40% larger than the average), gap C would be 105% of the average spacing, while gap D would be about 110% of the average spacing. It can also be seen that, for any given yarn in the repeat, the space or gap between that yarn and the yarn on either side is always different.

Figure 10:
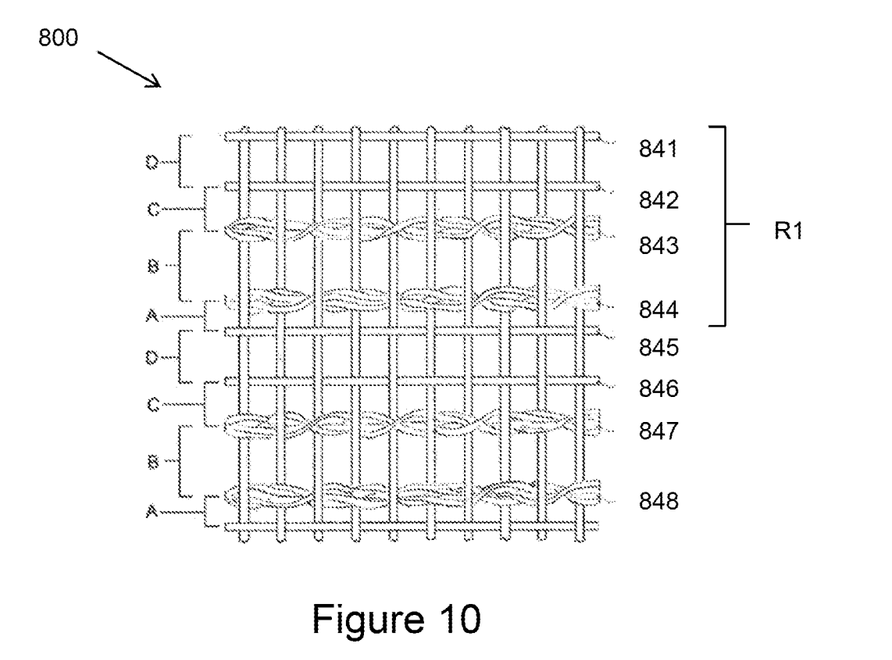
FIG. 10 is an illustration of a portion of a single layer woven base fabric according a third embodiment of the invention.

FIG. 10 is an illustration of a portion of a single layer woven base fabric 800 according to a third embodiment of the present invention. In fabric 800, the warp yarns are arranged vertically while the weft yarns, consisting of two systems of yarns numbered sequentially 841 to 848 and comprising single monofilaments such as 841, 842, 845, and 846, and cabled yarns 843, 844, 847, and 848 are arranged horizontally across the page, at right angles to the MD. One repeat of the weft yarn arrangement is indicated at R1 and includes four yarns numbered 841 to 844 represented as MMCC, where M indicates a monofilament, and C indicates a cabled yarn.

Beginning at the top of FIG. 10, one repeat R1 of the alternate weft yarn includes monofilaments 841 and 842 followed by cabled yarn 843 and 844. This weft yarn arrangement repeats over 4 weft yarns and recurs in this manner throughout single layer fabric 800. Further, it can be seen that this is an irregularly spaced yarn sequence in that the space separating any two successive yarns in either direction is not constant as indicated by the bracketed gaps A, B, C and D which indicate the center line to center line spacing between adjacent ones of the monofilaments and cabled yarns in the repeat R1 of fabric 800. In this third embodiment, two monofilaments 841 and 842 are arranged following one another to form gap D. The gap C is formed between the monofilament 842 and the called yarn 843. The Gap B is formed between the two cabled yarns 843 and 844. The gap A is formed between the cabled yarn 844 and the monofilament 845 that begins the next repeat. Accordingly, although the yarn sequence appears regular, due to the different types of yarns, the spacings are irregular.

Thus, several advantages of the novel yarn arrangement of the fabrics of the present invention are apparent from inspection of the Figures. First, the yarn arrangement appears to be effective in reducing the size of the elongated diamond shaped quadrilateral openings occurring when two single layer fabric woven according to the same design and from the same materials are overlaid upon one another to form a double layer base fabric. For example, as shown in relation to FIGS. 3 and 8, this size can be reduced by as much as 40% to 70% from about 0.86 mm in the prior art to 0.51 and 0.26 mm in the fabrics of the invention. This is due to the irregularly spaced yarn sequence and more preferably to a combination of the irregularly spaced yarn sequence and the irregular repeating sequence of the monofilament and cabled yarns and the knocking of the woven base fabric, which is higher in comparison to the prior art. Second, each of the quadrilateral openings is bordered by at least two and up to four cabled yarns (see FIGS. 7 and 8). This increases the number of batt attachment locations available when batt is needled to the fabric, thus reducing batt shedding in the completed fabric as these cabled yarns will hold and lock the batt fibers more reliably and securely than will be possible in structures comprised of entirely of single monofilament yarns. This provides the novel fabric with improved batt fiber distribution and uniformity during its useful life on the paper machine. Third, a mixture of monofilaments and cabled yarns arranged according to the irregular repeating sequences previously described serves to both maintain void volume in the press felts (as the single monofilaments will not collapse during use in the same manner as the cabled monofilaments, which will help to provide faster break in for the felt), and reduce any interference patterns in the resulting fabric. An additional benefit derived from the use of the monofilament warp yarns is the capability to form the seam loops using these yarns which are an MD fabric component. This will help to simplify seam installation and closure on the machine whether the base fabric of the invention is provided as a flat woven or multiaxial construction. Of course, it would be possible to provide either construction so that it is an endless sock or and does not contain a seam, with one loop being inserted within the other in order to form the stacked layers.

LIST OF ELEMENT NUMBERS

12—Warp yarns
12a, 12b—Warp yarns in first and second layers 100a, 100b
14—Weft yarns
14a, 14b—Weft yarns in first and second layers 100a, 100b
30, 31, 32, 33, 34, 35—Elongated diamond shaped quadrilateral openings
50—Short axis of 30, 31
100—Single layer prior art base fabric
100a—First single layer base fabric
100b—Second single layer base fabric
200—Double layer base fabric including fabrics 100a, 100b
500—First embodiment
512—Warp yarns in first embodiment
512a, 512b—Warp yarns in each layer of fabric 500 when superimposed in fabric 600
540 to 552—Weft yarns in first embodiment 500
600—Double layer fabric assembled from two layers of fabric 500
630, 631—Diamond shaped elongated quadrilateral openings in fabric 600
650, 651—Short axis of quadrilaterals 630, 631
700—Second embodiment
712—Warp yarns in second embodiment
740 to 753—Weft yarns in second embodiment
800—Third embodiment
841-848 Weft yarns in third embodiment
A—First weft yarn to weft yarn spacing
B—Second weft yarn to weft yarn spacing
C—Third weft yarn to weft yarn spacing
D—Fourth weft yarn to weft yarn spacing
R, R1, R2—One repeat of weft yarns
X—Prior art weft yarn spacing
Θ—Angle formed between weft yarns in two fabric layers

What is claimed is:

1. A press felt comprising two stacked layers of a woven single layer base fabric, each of the layers of the base fabric being formed by a system of warp yarns interwoven with first and second systems of weft yarns according to a defined single layer weave pattern, the two stacked layers being needled with at least one batt layer, wherein in the woven single layer base fabric,
   a) the warp yarns of the system of warp yarns are polymeric monofilaments arranged as a single layer and are interwoven with the weft yarns in the first and second systems of weft yarns;
   b) the weft yarns of the first system of weft yarns comprise cabled polymeric monofilaments and the weft yarns of the second system of weft yarns comprise single polymeric monofilaments;
   c) the cabled polymeric monofilaments comprise from 50% to 85% of the weft yarns and the single polymeric monofilaments make up from 50% to 15% of the weft yarns in one repeat of the base fabric weave construction;
   d) the cabled monofilaments are each comprised of at least two monofilaments which are cabled together; and
   e) at least two of the cabled weft yarns in each repeat are adjacent to each other; and
   f) a center line to center line first distance between any two adjacent ones of the weft yarns in one repeat of the repeating weave pattern differs from a corresponding center line to center line second distance between a second different set of adjacent ones of the weft yarns in the repeat, with both the first and the second distances being different than a center line to center line third distance between a third different set of adjacent ones of the weft yarns in the repeat.

2. The press felt according to claim 1, wherein the cabled weft yarns comprise at least 55% of the weft yarns.

3. The press felt according to claim 1, wherein the cabled weft yarns comprise at least 60% of the weft yarns.

4. The press felt according to claim 1, wherein the cabled monofilaments are each comprised of the 2 cabled monofilaments that are cabled together with two monofilaments which are also cabled together.

5. The press felt according to claim 1, wherein the monofilaments and the cabled monofilaments of the two weft yarn systems are arranged in one repeat of the base fabric weave pattern according to a repeating order which is represented by one of: MCMCC MCMCC; or MMCC MMCC; or MCMMCCMCC MCMMCCMCC pattern, where M=monofilament and C=cabled yarn, in the fabric strip.

6. The press felt according to 1, wherein a repeating order of the weft yarns in one repeat of the fabric weave is MCMCC.

7. The press felt according to 1, wherein a repeating order of the weft yarns in one repeat of the fabric weave is MCM-MCCMCC.

8. The press felt according to 1, wherein each of the single polymeric monofilaments of the second system of weft yarns is immediately adjacent to at least one of the cabled polymeric monofilaments of the first system of weft yarns, and each of the cabled polymeric monofilaments of the first system of weft yarns is immediately adjacent to at least a single one of the monofilaments of the second system of weft yarns.

9. The press felt according to 1, wherein each of the individual polymeric monofilaments comprising the first system of the cabled polymeric monofilaments is circular in cross-section and has a diameter of about 0.2 mm.

10. The press felt according to 1, wherein the single monofilaments of the second system of single polymeric monofilaments are circular in cross-section and have a diameter of about 0.3 mm.

11. The press felt according to 1, wherein a diameter of the monofilaments comprising the warp yarn system is about 33% greater than a diameter of the individual monofilaments of the second system of single polymeric monofilaments.

12. The press felt according to 1, wherein a diameter of the warp yarns is about 0.4 mm.

13. The press felt according to 1, wherein a knocking of the weft yarns in the fabric strip, including both the first system of cabled polymeric monofilaments and the second system of single polymeric monofilaments, is from about 8 yarns/cm (20.3 yarns/in) to about 12 yarns/cm (30.5 yarns/in).

14. The press felt according to 1, wherein a yarn to yarn spacing of individual ones of the weft yarns of each of the two weft yarn systems is irregular and a knocking of the weft yarns in the fabric strip is at least about 9.4 yarns/cm (23.9 yarns/in.).

15. The press felt according to 1, wherein the warp and the weft yarns of the first layer and the warp and the weft yarns of the second layer are canted with respect to one another to provide a plurality of openings each of which has a shape of an elongated diamond shaped quadrilateral when viewed from a direction normal to a plane of the base fabric, the quadrilaterals having a short axis across a width thereof and a long axis along a length thereof.

16. The press felt according to 15, wherein a perimeter of each of the elongated diamond shaped quadrilaterals includes at least two cabled yarns.

17. The press felt according to 15, wherein at least a portion of the diamond shaped quadrilaterals includes the cabled yarns located so as to form all four sides when viewed from a direction normal to the plane of the base fabric.

18. The press felt according to 15, wherein a knocking of the weft yarns in the fabric strip, including both the first system of cabled polymeric monofilaments and the second system of single polymeric monofilaments, is from about 8 yarns/cm (20.3 yarns/in) to about 12 yarns/cm (30.5 yarns/in.), and a width of the quadrilateral at the short axis is between about 0.2 mm and 0.6 mm.

19. The press felt according to 1, wherein at least a portion of the warp yarns of the fabric strip are used to form a fabric seam in the press felt.

20. The press felt according to 1, wherein the press felt is a seamed, spirally wound, multiaxial press felt and the woven single layer base fabric is a strip that is spirally wound with each adjacent turn being joined to its neighbor to form a tube that is collapsed to form the two stacked layers having a desired width and length for the press felt.

21. The press felt according to 1, wherein the press felt is a seamed press felt formed from two pieces of the woven single layer base fabric that form the two stacked layers having a desired length and width for the press felt.

22. The press felt according to claim 1, wherein the press felt is an endless woven press felt formed from the two stacked layers of the base fabric, each of the layers is woven as an endless loop, and one of the layers is inserted inside the other layer.

23. The press felt according to claim 1, wherein in one repeat of the weft yarns in the weave pattern of the woven single layer base fabric, the weft yarns are arranged such that a different distance is provided between each adjacent pairing of the weft yarns in the repeat.

24. The press felt according to claim 1, wherein a smallest of the first, the second, and the third distances is less than an average of the first, the second, and the third distances by 10% or more.

25. The press felt according to claim 24, wherein a largest of the first, the second, and the third distances is greater than the average by 10% or more.

26. The press felt according to claim 24, wherein the first, the second, and the third distances vary by from about 75% to about 140% of an average of the first, the second, and the third distances in one repeat of the weft yarns.

* * * * *